United States Patent
Sugiura et al.

(10) Patent No.: US 11,473,472 B2
(45) Date of Patent: Oct. 18, 2022

(54) EXHAUST GAS CONTROL APPARATUS AND MANUFACTURING METHOD THEREOF

(71) Applicants: TOYOTA JIDOSHA KABUSHIKI KAISHA, Toyota (JP); CATALER CORPORATION, Kakegawa (JP)

(72) Inventors: Koji Sugiura, Toyota (JP); Hiromasa Nishioka, Toyota (JP); Naoto Miyoshi, Toyota (JP); Akemi Satou, Toyota (JP); Keisuke Murawaki, Kakegawa (JP); Masatoshi Ikebe, Kakegawa (JP); Takaya Ota, Kakegawa (JP); Ryota Nakashima, Kakegawa (JP); Hirotaka Ori, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 0 days.

(21) Appl. No.: 17/231,474

(22) Filed: Apr. 15, 2021

(65) Prior Publication Data

US 2021/0324777 A1 Oct. 21, 2021

(30) Foreign Application Priority Data

Apr. 21, 2020 (JP) .............................. JP2020-075418

(51) Int. Cl.
*B01J 35/04* (2006.01)
*F01N 3/28* (2006.01)
(Continued)

(52) U.S. Cl.
CPC ........... *F01N 3/2835* (2013.01); *B01D 53/94* (2013.01); *B01J 35/04* (2013.01); *B01J 35/1076* (2013.01);
(Continued)

(58) Field of Classification Search
CPC ............... F01N 3/2835; F01N 2330/06; F01N 2510/0682; B01D 53/94;
(Continued)

(56) References Cited

U.S. PATENT DOCUMENTS 8,133,841 B2 * 3/2012 Noda .................... B01J 37/0234
422/177
2007/0084494 A1 * 4/2007 Dahulich ................ E04H 15/44
135/156
(Continued)

FOREIGN PATENT DOCUMENTS

EP 3623048 A1 3/2020
JP 6386697 B1 9/2018
(Continued)

*Primary Examiner* — Tom P Duong
(74) *Attorney, Agent, or Firm* — Oliff PLC

(57) ABSTRACT

An exhaust gas control apparatus includes a honeycomb substrate and an inlet cell-side catalyst layer. The honeycomb substrate includes a porous partition wall that defines a plurality of cells extending from an inlet-side end face to an outlet-side end face. The cells include an inlet cell and an outlet cell that are adjacent to each other with the partition wall therebetween. The inlet cell is open at its inlet-side end and is sealed at its outlet-side end. The outlet cell is sealed at its inlet-side end and is open at its outlet-side end. The inlet cell-side catalyst layer is provided on a surface on the inlet cell side of the partition wall and extends from an inlet-side end of the partition wall. Porosity of the inlet cell-side catalyst layer is in a specific range.

7 Claims, 3 Drawing Sheets

(51) Int. Cl.
    *B01D 53/94*     (2006.01)
    *B01J 35/10*     (2006.01)

(52) U.S. Cl.
    CPC ............... *B01D 2255/9202* (2013.01); *B01D 2255/9205* (2013.01); *B01J 35/1047* (2013.01); *F01N 2330/10* (2013.01)

(58) Field of Classification Search
    CPC ... B01D 2255/9205; B01J 35/04; B01J 35/10; B01J 37/0215; B01J 37/038
    USPC .................................................. 422/177, 180
    See application file for complete search history.

(56) References Cited

U.S. PATENT DOCUMENTS

| | | | | |
|---|---|---|---|---|
| 2009/0047188 | A1* | 2/2009 | Miyairi | F01N 3/0222 422/222 |
| 2009/0247396 | A1* | 10/2009 | Mizutani | B01D 53/944 502/100 |
| 2018/0252132 | A1* | 9/2018 | Suzuki | B01J 35/1076 |
| 2018/0266290 | A1* | 9/2018 | Burgess | B01D 53/9468 |
| 2020/0276567 | A1 | 9/2020 | Onoe et al. | |
| 2020/0368735 | A1 | 11/2020 | Sugiura et al. | |
| 2021/0283589 | A1* | 9/2021 | Sugiura | B01D 53/945 |

FOREIGN PATENT DOCUMENTS

| | | | |
|---|---|---|---|
| JP | 2018-187595 | A | 11/2018 |
| JP | 2019-516541 | A | 6/2019 |
| JP | 2020-193569 | A | 12/2020 |
| WO | 2017/170669 | A1 | 10/2017 |
| WO | 2018/173557 | A1 | 9/2018 |

\* cited by examiner

EXHAUST GAS CONTROL APPARATUS AND MANUFACTURING METHOD THEREOF

CROSS-REFERENCE TO RELATED APPLICATION

This application claims priority to Japanese Patent Application No. 2020-075418 filed on Apr. 21, 2020, incorporated herein by reference in its entirety.

BACKGROUND

1. Technical Field

The disclosure relates to an exhaust gas control apparatus that has a catalyst on a filter with a wall flow structure, and a manufacturing method thereof.

2. Description of Related Art

Exhaust gas that is emitted from internal combustion engines of automobiles etc. contains particulate matter (hereinafter sometimes abbreviated as "PM") mainly containing carbon, which is a cause of air pollution, ash that is a non-combustible component, etc. Filters with a wall flow structure are widely used as filters for collecting and removing PM from exhaust gas.

A filter with a wall flow structure usually includes a honeycomb substrate. The honeycomb substrate has a porous partition wall that defines a plurality of cells extending from an inlet-side end face to an outlet-side end face. The cells include an inlet cell and an outlet cell that are adjacent to each other with the partition wall therebetween. The inlet cell is open at its inlet-side end and is sealed at its outlet-side end. The outlet cell is sealed at its inlet-side end and is open at its outlet-side end. Accordingly, exhaust gas having entered the inlet cell from the inlet-side end passes through the partition wall into the outlet cell and is discharged from the outlet-side end of the outlet cell. When the exhaust gas passes through the partition wall, PM is collected in pores of the partition wall. Known examples of the filter with a wall flow structure include a diesel particulate filter (DPF) for diesel engines and a gasoline particulate filter (GPF) for gasoline engines.

Exhaust gas contains harmful components such as carbon monoxide (CO), hydrocarbons (HCs), and nitrogen oxides (NOx) in addition to the PM. The harmful components can be removed from the exhaust gas by a filter coated with a catalyst such as a noble metal catalyst.

Exhaust gas control apparatuses having a catalyst on a filter with a wall flow structure have been recently used in order to remove both the PM and the harmful components from exhaust gas. For example, WO 2018/173557 describes an exhaust gas control catalyst that is disposed in an exhaust passage of an internal combustion engine to control exhaust gas discharged from the internal combustion engine. This exhaust gas control catalyst includes a substrate with a wall flow structure, a first catalyst layer, and a second catalyst layer. The substrate has a porous partition wall that separates an inlet-side cell and an outlet-side cell from each other. The inlet-side cell is open only at its end on the exhaust gas inlet side and extends in an extending direction of the substrate, and the outlet-side cell is open only at its end on the exhaust gas outlet side and extends in the extending direction. The first catalyst layer is formed on a surface on the inlet-side cell of the partition wall and has a length in the extending direction smaller than the total length $L_W$ of the partition wall from the end on the exhaust gas inlet side. The second catalyst layer is formed inside the partition wall in at least a part of a region facing the outlet-side cell so as to extend in the extending direction from the end on the exhaust gas outlet side.

Japanese Unexamined Patent Application Publication No. 2018-187595 (JP 2018-187595 A) describes an exhaust gas control apparatus having a honeycomb substrate and an inlet-side coating layer. The honeycomb substrate has a plurality of cells defined by a porous partition wall. The cells include an inlet-side cell that is open on the upstream side of the exhaust gas flow and is sealed on the downstream side of the exhaust gas flow, and an outlet-side cell that is sealed on the upstream side of the exhaust gas flow and is open on the downstream side of the exhaust gas flow. The honeycomb substrate is thus configured so that exhaust gas having entered the inlet-side cell passes through the partition wall and is discharged from the outlet-side cell. The inlet-side coating layer exists on the surface on the inlet-side cell side of the partition wall. The proportion of through pores with a diameter of 4 μm to 9 μm is 80 vol % or more in through pore diameter distribution in the partition wall, as measured by the bubble point method using a perm porometer. The peak pore diameter as measured by the mercury intrusion technique using a mercury porosimeter is larger by 3.0 μm or more than the peak through pore diameter as measured by the bubble point method using a perm porometer.

SUMMARY

Even such techniques are not enough to sufficiently meet recent required levels for exhaust gas control performance, and there is still room for improvement.

The disclosure provides an exhaust gas control apparatus having a catalyst on a filter with a wall flow structure and capable of further improving exhaust gas control performance.

FIG. 1A illustrates an example of the exhaust gas flow in a cell in an exhaust gas control apparatus having a catalyst on a honeycomb substrate with a straight flow structure. FIG. 1B illustrates an example of the exhaust gas flow in cells in an exhaust gas control apparatus having a catalyst on a filter with a wall flow structure.

In exhaust gas control apparatuses with a straight flow structure such as that shown in FIG. 1A, exhaust gas typically flows through the exhaust gas control apparatus without passing through a partition wall, as shown by arrows in FIG. 1A. When forming a catalyst layer on the wall surface of the honeycomb substrate, porosity of the catalyst layer can be increased by adding a pore-forming material to slurry. This improves diffusion properties of exhaust gas in the catalyst layer and improves exhaust gas control performance of the catalyst.

In exhaust gas control apparatuses with a wall flow structure such as that shown in FIG. 1B, exhaust gas flows through the exhaust gas control apparatus while passing through a partition wall, as shown by arrows in FIG. 1B. If an excessive amount of pore-forming material is added to slurry when forming a catalyst layer on the partition wall of a honeycomb substrate, porosity of the catalyst layer becomes too high. Exhaust gas is therefore discharged through the partition wall near the inlet end of an inlet cell, as shown by a crossed-out arrow in FIG. 1B. That is, exhaust gas is discharged without diffusing in the catalyst layer. As a result, the exhaust gas cannot sufficiently react with the catalyst layer in the axial direction, and exhaust gas control performance of the catalyst is degraded.

The inventors examined various means for solving the above problem and found that, for exhaust gas control apparatuses having a catalyst on a filter with a wall flow structure and including a honeycomb substrate and an inlet cell-side catalyst layer, exhaust gas control performance can be improved by adjusting porosity of the inlet cell-side catalyst layer to a specific range. The inventors completed the disclosure based on these findings.

(1) An aspect of the disclosure relates to an exhaust gas control apparatus including a honeycomb substrate and an inlet cell-side catalyst layer.

The honeycomb substrate includes a porous partition wall that defines a plurality of cells extending from an inlet-side end face to an outlet-side end face. The cells include an inlet cell and an outlet cell that are adjacent to each other with the partition wall between the inlet cell and the outlet cell. The inlet cell is open at an inlet-side end of the inlet cell and is sealed at an outlet-side end of the inlet cell. The outlet cell is sealed at an inlet-side end of the outlet cell and is open at an outlet-side end of the outlet cell. The inlet cell-side catalyst layer is provided on a surface on an inlet cell side of the partition wall and extends from an inlet-side end of the partition wall. Porosity of the inlet cell-side catalyst layer is 0.1% to 8% as measured in a binarized scanning electron microscope (SEM) image of a section of the inlet cell-side catalyst layer.

(2) The porosity of the inlet cell-side catalyst layer based on pores with a diameter of 4 μm to 10 μm may be 1% to 5% as measured by mercury porosimetry.

(3) The inlet cell-side catalyst layer may be provided on the surface on the inlet cell side of the partition wall and extend to a position of 5% to 90% of a total length in an extending direction of the honeycomb substrate from the inlet-side end of the partition wall.

(4) A content of the inlet cell-side catalyst layer may be 30 g to 150 g per liter of a part of the honeycomb substrate in which the inlet cell-side catalyst layer is provided.

(5) The exhaust gas control apparatus may further include an outlet cell-side catalyst layer provided on a surface on an outlet cell side of the partition wall and extending from an outlet-side end of the partition wall.

(6) A second aspect of the disclosure relates to a method for manufacturing the exhaust gas control apparatus of the first aspect.

The method includes: supplying slurry for forming the inlet cell-side catalyst layer into the inlet cell of the honeycomb substrate to form a slurry inlet cell-side catalyst layer; and firing the honeycomb substrate after the slurry inlet-cell side catalyst layer is formed.

The slurry for forming the inlet cell-side catalyst layer contains 1 wt % to 3 wt % of a pore-forming material based on a total weight of the inlet cell-side catalyst layer.

(7) The pore-forming material may be a fibrous pore-forming material, an average diameter of the pore-forming material may be 0.7 μm to 15 μm, and an average aspect ratio of the pore-forming material may be 9 to 40.

According to the disclosure, an exhaust gas control apparatus is provided which has a catalyst on a filter having a wall flow structure and has further improved exhaust gas control performance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1A:
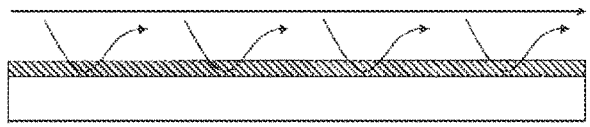
FIG. 1A schematically illustrates an example of the exhaust gas flow in a cell in an exhaust gas control apparatus having a catalyst on a honeycomb substrate with a straight flow structure.
Figure 1B:
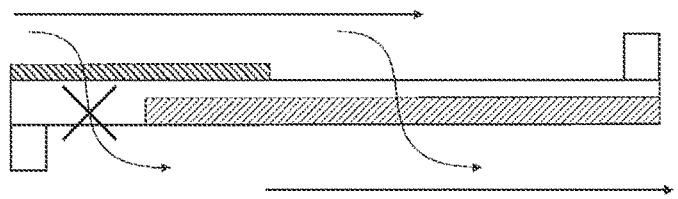
FIG. 1B illustrates an example of the exhaust gas flow in cells in an exhaust gas control apparatus having a catalyst on a filter with a wall flow structure.

A preferred embodiment of the disclosure will be described in detail. In the specification, features of the disclosure will be described with reference to the drawings, as necessary. In the drawings, the dimensions and shapes of parts are shown exaggerated for clarity. The drawings therefore do not accurately illustrate the actual dimensions and shapes. Accordingly, the technical scope of the disclosure is not limited to the dimensions and shapes of the parts illustrated in the drawings. An exhaust gas control apparatus and a manufacturing method thereof according to the disclosure are not limited to the following embodiment and can be embodied in various modified or improved forms etc. that can be implemented by those skilled in the art without departing from the spirit and scope of the disclosure.

The disclosure relates to an exhaust gas control apparatus including a honeycomb substrate and an inlet cell-side catalyst layer. The honeycomb substrate includes a porous partition wall that defines a plurality of cells extending from an inlet-side end face to an outlet-side end face. The cells include an inlet cell and an outlet cell that are adjacent to each other with the partition wall therebetween. The inlet cell is open at its inlet-side end and is sealed at its outlet-side end. The outlet cell is sealed at its inlet-side end and is open at its outlet-side end. The inlet cell-side catalyst layer is provided on a surface on an inlet cell side of the partition wall and extends from an inlet-side end of the partition wall. Porosity of the inlet cell-side catalyst layer is in a specific range.

Each configuration of the exhaust gas control apparatus of the disclosure will be described in detail.

1. Honeycomb Substrate

The honeycomb substrate has a porous partition wall that defines a plurality of cells extending from an inlet-side end face to an outlet-side end face. The cells include an inlet cell and an outlet cell that are adjacent to each other with the partition wall therebetween. The inlet cell is open at its inlet-side end and is sealed at its outlet-side end, and the outlet cell is sealed at its inlet-side end and is open at its outlet-side end. The honeycomb substrate is what is called a wall flow honeycomb substrate.

As used herein, the "inlet side" refers to the side from which exhaust gas enters the exhaust gas control apparatus, and the "outlet side" refers to the side from which exhaust gas leaves the exhaust gas control apparatus.

The honeycomb substrate is a substrate composed of a frame and the partition wall that divides the space inside the frame into a honeycomb of cells.

Although the axial length of the honeycomb substrate is not particularly limited and can be a commonly used length, it is usually 10 mm to 500 mm, preferably 50 mm to 300 mm. Although the capacity of the honeycomb substrate, that is, the total capacity of the cells, is not particularly limited and can be a commonly used capacity, it is usually 0.1 L to 5 L.

Although the material of the honeycomb substrate is not particularly limited and can be a commonly used material, examples of the material of the honeycomb substrate include: ceramics such as cordierite, silicon carbide (SiC), and aluminum titanate; and alloys such as stainless steel.

Although the shape of the frame is not particularly limited and can be a commonly used shape, the shape of the frame is, e.g., a tube such as a cylinder, an elliptical cylinder, or a polygonal cylinder. Other configurations of the frame are not particularly limited and can be commonly used configurations.

The shape of the partition wall is not particularly limited and can be a commonly used shape. The extending direction of the partition wall is not particularly limited, but is usually substantially the same as the axial direction of the honeycomb substrate. The extending direction of the cells is not particularly limited, but is usually substantially the same as the extending direction of the partition wall. As used herein, the "extending direction" refers to the extending direction of the partition wall and the extending direction of the cells and indicates substantially the same direction as the axial direction of the honeycomb substrate. The length in the extending direction of the partition wall is not particularly limited, but is usually substantially the same as the axial length of the honeycomb substrate. Although the thickness of the partition wall is not particularly limited and can be a commonly used thickness, it is usually 50 μm to 2000 μm, preferably 100 μm to 1000 μm. With the thickness of the partition wall being in this range, sufficient PM collection performance is achieved while ensuring the strength of the substrate, and pressure loss is sufficiently reduced.

The partition wall has a porous structure through which exhaust gas can pass. Although the porosity of the partition wall is not particularly limited and can be a commonly used porosity, it is usually 40% to 70%, preferably 50% to 70%. With the porosity being equal to or higher than the lower limit of this range, pressure loss is effectively reduced. With the porosity being equal to or lower than the upper limit of this range, sufficient mechanical strength is ensured. Although the average diameter of pores of the partition wall is not particularly limited and can be a commonly used average diameter, it is usually 1 μm to 60 μm, preferably 5 μm to 30 μm. With the average diameter of the pores being in this range, sufficient PM collection performance is achieved, and pressure loss is sufficiently reduced. For example, the "average diameter of the pores of the partition wall" refers to the average diameter as measured by the bubble point method using a perm porometer.

The inlet cell and the outlet cell are formed by dividing the space inside the frame by the partition wall and are adjacent to each other with the partition wall therebetween. The inlet cell and the outlet cell are usually surrounded by the partition wall in directions perpendicular to the extending direction of the inlet and outlet cells.

The inlet cell is usually sealed at its outlet-side end by a sealing portion. The outlet cell is usually sealed at its inlet-side end by a sealing portion. Although the length in the extending direction of the sealing portion is not particularly limited and can be a commonly used length, it is usually 2 mm to 20 mm. The material of the sealing portions is not particularly limited and can be a commonly used material.

The sectional shape of the inlet and outlet cells taken perpendicular to the extending direction of the inlet and outlet cells is not particularly limited and can be a commonly used sectional shape. The sectional shape of the inlet and outlet cells taken perpendicular to the extending direction of the inlet and outlet cells can be determined as appropriate in view of the flow rate, components, etc. of exhaust gas that passes through the exhaust gas control apparatus. Examples of the sectional shape include rectangles such as a square, polygons such as a hexagon, and a circle. Although the sectional area of the inlet and outlet cells taken perpendicular to the extending direction of the inlet and outlet cells is not particularly limited and can be a commonly used sectional area, it is usually 1 mm$^2$ to 7 mm$^2$. The length in the extending direction of the inlet and outlet cells is not particularly limited, but is usually substantially the same as the axial length of the honeycomb substrate minus the length in the extending direction of the sealing portion. For example, the arrangement pattern of the inlet and outlet cells is a checkered pattern in which the inlet and outlet cells are alternately arranged.

2. Inlet Cell-Side Catalyst Layer

In the exhaust gas control apparatus of the disclosure, the inlet cell-side catalyst layer is provided on a surface on the inlet cell side of the partition wall and extends from the inlet-side end of the partition wall.

The inlet cell-side catalyst layer being provided on the surface on the inlet cell side of the partition wall means that the inlet cell-side catalyst layer is provided outside the partition wall so as to be in contact with the surface on the inlet cell side of the partition wall. The inlet cell-side catalyst layer provided in this manner is sometimes called the "on-wall inlet cell-side catalyst layer."

The porosity of the inlet cell-side catalyst layer is 0.1% to 8%, preferably 1% to 5%, as measured in a binarized scanning electron microscope (SEM) image of a section of the inlet cell-side catalyst layer.

The "binarized SEM image of the section of the inlet cell-side catalyst layer" is specifically obtained as follows.

(1) A backscattered electron SEM image of the section of the inlet cell-side catalyst layer is obtained (magnification: 3000×), and the obtained SEM image is binarized using analysis software such as WinROOF to separate pores in the inlet cell-side catalyst layer.

(2) The proportion (%) of the pores separated in step (1) in the total area of the inlet cell-side catalyst layer is obtained.

(3) The steps (1) and (2) are performed for 10 images and the average value is obtained.

The inlet cell-side catalyst layer has a volume of pores as defined by the porosity. The pores in the inlet cell-side catalyst layer are composed of small pores with a diameter of 4 μm or less, medium pores with a diameter of 4 μm to 10 μm, and large pores with a diameter of 10 μm or more. The porosity of the inlet cell-side catalyst layer based on the medium pores with a diameter of 4 μm to 10 μm is usually 1% to 5%, preferably 3% to 5%, as measured by mercury porosimetry. With the proportion of the medium pores with a diameter of 4 μm to 10 μm in the inlet cell-side catalyst layer being in this range, exhaust gas is efficiently diffused in the inlet cell-side catalyst layer.

Exhaust gas enters the exhaust gas control apparatus from the inlet cell, passes through the partition wall, and then leaves the exhaust gas control apparatus from the outlet cell. Harmful components in the exhaust gas are removed by the catalyst in the inlet cell-side catalyst layer, and PM in the exhaust gas is collected by the partition wall. That is, in order to efficiently control exhaust gas, it is desirable that the exhaust gas pass through the partition wall after being sufficiently in contact with the inlet cell-side catalyst layer. In the disclosure, since the inlet cell-side catalyst layer is provided in the inlet cell, the pores in the inlet cell side of the partition wall are closed by the inlet cell-side catalyst layer. Most of exhaust gas is therefore controlled while traveling down the inlet cell-side catalyst layer without passing through the partition wall near the inlet-side end of the inlet cell, and then passes through the partition wall so that PM is collected. In the disclosure, the porosity of the inlet cell-side catalyst layer is adjusted to the above range. That is, the inlet cell-side catalyst layer has a volume of pores as defined by the porosity. The pores in the inlet cell-side catalyst layer improve the diffusion efficiency of exhaust gas in the inlet cell-side catalyst layer. As a result, the catalyst utilization of the inlet cell-side catalyst layer is increased, and the exhaust gas control efficiency is also improved. If the porosity of the inlet cell-side catalyst layer is too high, exhaust gas may be discharged through the partition wall near the inlet-side end of the inlet cell. However, since the upper limit value of the porosity of the inlet cell-side catalyst layer is set to the above value, exhaust gas is less likely to be discharged through the partition wall near the inlet-side end of the inlet cell.

The length in the extending direction of the inlet cell-side catalyst layer is usually 5% to 90%, preferably 10% to 90%, more preferably 20% to 80%, even more preferably 20% to 50%, of the total length in the extending direction of the honeycomb substrate. With the length being equal to or larger than the lower limit of this range, a sufficient contact time of exhaust gas with the inlet cell-side catalyst layer is ensured even in situations where the flow rate of the exhaust gas is high under high load operating conditions. Exhaust gas control performance is therefore improved. With the length being equal to or smaller than the upper limit of this range, pressure loss is effectively reduced. In addition, a part of the partition wall on which the inlet cell-side catalyst layer is not provided has a length in the extending direction larger than an expected ash deposit thickness.

Although the thickness of the inlet cell-side catalyst layer is not particularly limited and can be a commonly used thickness, it is preferably in the range of, e.g., 5% to 30% of the thickness of the partition wall. With the thickness being equal to or larger than the lower limit of this range, passage of exhaust gas through the partition wall near the inlet-side end of the inlet cell is effectively reduced. The upper limit of the thickness range of the inlet cell-side catalyst layer can be set as appropriate in view of pressure loss etc.

The inlet cell-side catalyst layer usually includes catalytic metal particles and a support having the catalytic metal particles supported thereon. For example, the inlet cell-side catalyst layer is a porous sintered support with catalyst that has catalytic metal particles supported thereon.

Although the material of the catalytic metal particles is not particularly limited and can be a commonly used material, examples of the material of the catalytic metal particles include noble metals such as rhodium (Rh), palladium (Pd), and platinum (Pt). The material of the catalytic metal particles may be one metal, two or more metals, or an alloy containing two or more metals. The material of the catalytic metal particles is preferably at least one selected from the group consisting of Pd, Pt, etc.

Although the average particle size of the catalytic metal particles is not particularly limited and can be a commonly used average particle size, it is usually 0.1 nm to 20 nm. With the average particle size being equal to or smaller than the upper limit of this range, the catalytic metal particles have an increased contact area with exhaust gas. For example, the average particle size of the catalytic metal particles refers to the average equivalent circular diameter obtained from the area of the particles measured by a transmission electron microscope (TEM).

Although the content of the catalytic metal particles is not particularly limited and can be a commonly used content, the content of the catalytic metal particles varies depending on the material of the catalytic metal particles. For example, when the material of the catalytic metal particles is Pd, Pt, or Rh, the content of the catalytic metal particles is usually 0.05 g to 5 g per liter of the honeycomb substrate. With the content being equal to or higher than the lower limit of this range, a sufficient catalytic action is achieved. With the content being equal to or lower than the upper limit of this range, grain growth of the catalytic metal particles is reduced. The content being equal to or lower than the upper limit of this range is also advantageous in terms of cost. The content of the catalytic metal particles per liter of the honeycomb substrate refers to the weight of the catalytic metal particles contained in the inlet cell-side catalyst layer divided by the volume (L) of the honeycomb substrate.

Although the material of the support is not particularly limited and can be a commonly used material, examples of the material of the support include metal oxides such as alumina ($Al_2O_3$), zirconia ($ZrO_2$), ceria ($CeO_2$), silica ($SiO_2$), magnesia (MgO), and titanium oxide ($TiO_2$), a ceria-zirconia ($CeO_2$—$ZrO_2$) composite oxide, and solid solutions of these substances. The material of the support may be one or more of these substances. The material of the support is preferably at least one selected from the group consisting of alumina, a ceria-zirconia composite oxide, etc.

Although the form of the support is not particularly limited and can be a commonly used form, the support is preferably in the form of powder. With the support being in the form of powder, a larger specific area is achieved. The average particle size of the support in the form of powder is not particularly limited, but is usually 0.01 μm to 20 μm. With the average particle size being equal to or larger than the lower limit of this range, the support has sufficient heat resistance properties. With the average particle size being equal to or smaller than the upper limit of this range, the catalytic metal particles are allowed to disperse sufficiently on the support, and exhaust gas control performance is therefore effectively improved. For example, the "average particle size of the support in the form of powder" refers to the median particle size in particle size distribution obtained by a laser diffraction method.

Although the ratio of the weight of the catalytic metal particles to the total weight of the catalytic metal particles and the support is not particularly limited and can be a commonly used ratio, it is usually 0.01 wt % to 10 wt %. With the weight ratio being equal to or higher than the lower limit of this range, a sufficient catalytic action is achieved. With the weight ratio being equal to or lower than the upper limit of this range, grain growth of the catalytic metal particles is reduced. The weight ratio being equal to or lower than the upper limit of this range is also advantageous in terms of cost.

Although a method for causing the catalytic metal particles to be supported on the support is not particularly limited and can be a commonly used method, an example of the method is a method in which the support is impregnated with an aqueous solution containing a catalytic metal salt (e.g., a nitrate etc.) or a catalytic metal complex (e.g., a tetraammine complex etc.) and is then dried and fired.

The inlet cell-side catalyst layer may include a co-catalyst that does not have the catalytic metal particles supported thereon, in addition to the catalytic metal particles and the support. Although the co-catalyst is not particularly limited and can be a commonly used co-catalyst, examples of the co-catalyst include alumina, silica, and a ceria-zirconia composite oxide. Although the form of the co-catalyst is not particularly limited and can be a commonly used form, the co-catalyst is preferably in the form of powder. Although the ratio of the weight of the co-catalyst to the total weight of the catalytic metal particles, the support, and the co-catalyst is not particularly limited and can be a commonly used ratio, it is usually 30 wt % to 80 wt %.

The inlet cell-side catalyst layer may be a single catalyst layer or may include a stack of a plurality of different catalyst layers. Examples of the inlet cell-side catalyst layer including a stack of a plurality of different catalyst layers include a catalyst layer including a stack of a plurality of catalyst layers including different catalytic metal particles, and a catalyst layer including a stack of a plurality of catalyst layers with different lengths in the extending direction. A more specific example of the inlet cell-side catalyst layer including a stack of a plurality of different catalyst layers is a catalyst layer including a stack of a catalyst layer including catalytic metal particles composed of palladium (Pd) and a catalyst layer including catalytic metal particles composed of rhodium (Rh), in which the stack is formed by sequentially supplying slurry for the former catalyst layer and slurry for the latter catalyst layer to the surface of the partition wall such that the catalyst layers have different lengths in the in-plane direction.

Although the content of the inlet cell-side catalyst layer is not particularly limited, it is usually 30 g to 150 g, preferably 40 g to 100 g, more preferably 40 g to 80 g, per liter of a part of the honeycomb substrate in which the inlet cell-side catalyst layer is provided. With the content of the inlet cell-side catalyst layer being equal to or higher than the lower limit of this range, exhaust gas control performance is effectively improved. With the content of the inlet cell-side catalyst layer being equal to or lower than the upper limit of this range, pressure loss is effectively reduced. The content of the inlet cell-side catalyst layer per liter of the part of the honeycomb substrate in which the inlet cell-side catalyst layer is provided refers to the weight of the inlet cell-side catalyst layer divided by the volume (L) of the part of the honeycomb substrate in which the inlet cell-side catalyst layer is provided.

Although a method for forming the inlet cell-side catalyst layer is not particularly limited except that a pore-forming material is used, and can be a commonly used method, an example of the method is a method in which slurry for forming the inlet cell-side catalyst layer, which contains a pore-forming material, is supplied to the surface on the inlet cell side of the partition wall and is then dried and fired.

The slurry for forming the inlet cell-side catalyst layer contains the catalytic metal particles and support that are contained in the inlet cell-side catalyst layer and a pore-forming material for forming pores. The slurry may contain as appropriate any component such as an oxygen absorbing and releasing material, a binder, and an additive, in addition to the catalytic metal particles, the support, and the pore-forming material. The average particle size etc. of the support in the form of powder contained in the slurry may be adjusted as appropriate so that the slurry will not penetrate the partition wall.

The pore-forming material contained in the slurry for forming the inlet cell-side catalyst layer functions to form pores in the inlet cell-side catalyst layer as it disappears during firing that is performed after the slurry is supplied to the surface of the partition wall. It is therefore preferable that the pore-forming material be particles made of a material that stably exists as primary particles or secondary particles in the slurry for forming the inlet cell-side catalyst layer and in the slurry inlet cell-side catalyst layer and that easily disappears during firing.

The pore-forming material contained in the slurry for forming the inlet cell-side catalyst layer is a fibrous pore-forming material. Examples of the pore-forming material include polyethylene terephthalate (PET) fibers, acrylic fibers, nylon fibers, rayon fibers, and cellulose fibers. It is preferable in view of the balance between workability and firing temperature that the pore-forming material contained in the slurry for forming the inlet cell-side catalyst layer be at least one selected from the group consisting of PET fibers and nylon fibers.

The average diameter (average fiber diameter) of the pore-forming material contained in the slurry for forming the inlet cell-side catalyst layer is usually 0.7 μm to 15 μm. With the average diameter of the pore-forming material being in this range, appropriate macropores, that is, medium pores with a diameter of 4 μm to 10 μm are formed, and catalytic performance of the resultant exhaust gas control catalyst is improved. Moreover, bulkiness of the resultant inlet cell-side catalyst layer is adjusted to an appropriate range. The average diameter (average fiber diameter) of the pore-forming material is preferably 1 μm to 12 μm, more preferably 2 μm to 10 μm, from the standpoint that the average diameter (average fiber diameter) of the pore-forming material is in the range suitable for gas diffusion properties. The average diameter (average fiber diameter) of the pore-forming material can be obtained by randomly extracting 50 or more fibers of the pore-forming materials, measuring the fiber diameters of the fibers, and calculating the average value of the measured fiber diameters by using, e.g., a scanning electron microscope (SEM).

The average aspect ratio of the pore-forming material contained in the slurry for forming the inlet cell-side catalyst layer is usually 9 to 40, preferably 9 to 30, more preferably 9 to 28. With the average aspect ratio of the pore-forming material being in this range, sufficient pore communication is provided and satisfactory gas diffusion properties is therefore achieved. Moreover, satisfactory catalytic performance is achieved due to sufficient contact between gas and catalytic active sites. As a result, the balance between gas diffusion properties and catalytic performance is achieved. The average aspect ratio of the pore-forming material is defined as "average fiber length/average diameter (average fiber diameter)." As used herein, the fiber length is the straight line distance between the start and end points of a fiber. The average fiber length can be obtained by randomly extracting 50 or more fibers of the pore-forming materials, measuring the fiber lengths of the fibers, and calculating the average value of the measured fiber lengths by using, e.g., a scanning electron microscope (SEM). The average diameter is as described above.

The content of the pore-forming material in the slurry for forming the inlet cell-side catalyst layer is adjusted to 1 wt % to 3 wt %, preferably 2 wt % to 3 wt %, based on the total weight of the inlet cell-side catalyst layer. By adjusting the content to this range, the porosity of the inlet cell-side catalyst layer can be adjusted to the range described above.

Although a method for supplying the slurry for forming the inlet cell-side catalyst layer to the surface on the inlet cell side of the partition wall is not particularly limited and can be a commonly used method, an example of the method is a method in which the honeycomb substrate is immersed in the slurry from the inlet-side end face, and is removed from the slurry after a predetermined time. In this method, the outlet cell may be pressurized from the outlet-side end to cause a pressure difference between the outlet cell and the inlet cell so that the slurry will not penetrate the partition wall. Properties of the slurry such as solid concentration and viscosity may be adjusted as appropriate so that the slurry will not penetrate the partition wall.

In the method in which the slurry for forming the inlet cell-side catalyst layer is supplied to the surface on the inlet cell side of the partition wall and is then dried and fired, drying conditions are not particularly limited, but preferred drying conditions are that the slurry is dried at usually 80° C. to 300° C. for usually one hour to 10 hours, although it depends on the shape or form and dimensions of the honeycomb substrate and support. Although firing conditions are not particularly limited as long as the firing temperature is a temperature at which the pore-forming material disappears, preferred firing conditions are that the slurry is fired at usually 400° C. to 1000° C. for usually one hour to four hours.

Properties of the inlet cell-side catalyst layer such as thickness can be adjusted by the properties of the slurry, the amount of slurry to be supplied, the drying conditions, the firing conditions, etc.

3. Outlet Cell-Side Catalyst Layer

The exhaust gas control apparatus of the disclosure may further include an outlet cell-side catalyst layer provided on a surface on the outlet cell side of the partition wall or in an internal region in the outlet cell side of the partition wall and extending from the outlet-side end of the partition wall.

The outlet cell-side catalyst layer being provided on the surface on the outlet cell side of the partition wall means that the outlet cell-side catalyst layer is provided outside the partition wall so as to be in contact with the surface on the outlet cell side of the partition wall. The outlet cell-side catalyst layer provided in this manner is sometimes called the "on-wall outlet cell-side catalyst layer." The outlet cell-side catalyst layer being provided in the internal region in the outlet cell side of the partition wall means that the outlet cell-side catalyst layer is provided in a region inside the partition wall that faces the outlet cell. The outlet cell-side catalyst layer provided in this manner is sometimes called the "in-wall outlet cell-side catalyst layer."

Of the outlet cell-side catalyst layers, the outlet cell-side catalyst layer provided on the surface on the outlet cell side of the partition wall has a large contact area with exhaust gas flowing into the outlet cell, and therefore exhaust gas control performance is effectively improved. On the other hand, in the outlet cell-side catalyst layer provided in the internal region in the outlet cell side of the partition wall, gas permeability of the outlet cell side of the partition wall is increased. The outlet cell-side catalyst layer provided on the surface on the outlet cell side of the partition wall and the outlet cell-side catalyst layer provided in the internal region in the outlet cell side of the partition wall will be separately described.

a. Outlet Cell-Side Catalyst Layer Provided on the Surface on the Outlet Cell Side of the Partition Wall The length in the extending direction of the outlet cell-side catalyst layer is usually 10% to 100%, preferably 30% to 100%, more preferably 50% to 100%, of the total length in the extending direction of the honeycomb substrate. With the length being equal to or larger than the lower limit of this range, a sufficient contact time of exhaust gas with the outlet cell-side catalyst layer is ensured even in situations where the flow rate of the exhaust gas is high under high load operating conditions. Exhaust gas control performance is therefore improved.

Although the thickness of the outlet cell-side catalyst layer is not particularly limited and can be a commonly used thickness, it is preferably in the range of, e.g., 5% or more of the thickness of the partition wall. With the thickness being equal to or larger than the lower limit of this range, flow of exhaust gas from the inlet cell to the outlet cell can be adjusted. The upper limit of the thickness range of the outlet cell-side catalyst layer can be set as appropriate in view of pressure loss etc.

The outlet cell-side catalyst layer usually includes catalytic metal particles and a support having the catalytic metal particles supported thereon. For example, the outlet cell-side catalyst layer is a porous sintered support with catalyst that has catalytic metal particles supported thereon.

Since the material of the catalytic metal particles is similar to that in the inlet cell-side catalyst layer except that rhodium (Rh) etc. are preferable, description thereof will be omitted. Since the average particle size of the catalytic metal particles is similar to that in the inlet cell-side catalyst layer, description thereof will be omitted.

Although the content of the catalytic metal particles is not particularly limited and can be a commonly used content, the content of the catalytic metal particles varies depending on the material of the catalytic metal particles. For example, when the material of the catalytic metal particles is Rh, Pd, or Pt, the content of the catalytic metal particles is usually 0.01 g to 2 g per liter of the honeycomb substrate. With the content being equal to or higher than the lower limit of this range, a sufficient catalytic action is achieved. With the content being equal to or lower than the upper limit of this range, grain growth of the catalytic metal particles is reduced. The content being equal to or lower than the upper limit of this range is also advantageous in terms of cost. The content of the catalytic metal particles per liter of the honeycomb substrate refers to the weight of the catalytic metal particles contained in the outlet cell-side catalyst layer divided by the volume (L) of the honeycomb substrate.

Since the material and form of the support and the average particle size of the support in the form of powder are similar to those in the inlet cell-side catalyst layer, description thereof will be omitted. Since the ratio of the weight of the catalytic metal particles to the total weight of the catalytic metal particles and the support is similar to that in the inlet cell-side catalyst layer, description thereof will be omitted. Since a method for causing the catalytic metal particles to be supported on the support is similar to that for the inlet cell-side catalyst layer, description thereof will be omitted.

Like the inlet cell-side catalyst layer, the outlet cell-side catalyst layer may also include a co-catalyst.

Although the content of the outlet cell-side catalyst layer is not particularly limited, it is usually 30 g to 250 g, preferably 50 g to 150 g, per liter of a part of the honeycomb substrate in which the outlet cell-side catalyst layer is provided. For example, the content of the outlet cell-side catalyst layer is usually 1.0 to 3.0 times, preferably 1.5 times to 2.5 times, and for example, 2.0 times, the content of the inlet cell-side catalyst layer. With the content of the outlet cell-side catalyst layer being equal to or higher than the lower limit of this range, exhaust gas control performance is effectively improved. With the content of the outlet cell-side catalyst layer being equal to or lower than the upper limit of this range, pressure loss is effectively reduced. The content of the outlet cell-side catalyst layer per liter of the part of the honeycomb substrate in which the outlet cell-side catalyst layer is provided refers to the weight of the outlet cell-side catalyst layer divided by the volume (L) of the part of the honeycomb substrate in which the outlet cell-side catalyst layer is provided.

Although a method for forming the outlet cell-side catalyst layer is not particularly limited and can be a commonly used method, an example of the method is a method in which slurry for forming the outlet cell-side catalyst layer is supplied to the surface on the outlet cell side of an outlet cell-side catalyst region of the partition wall and is then dried and fired.

The slurry for forming the outlet cell-side catalyst layer is similar to that in the method for forming the inlet cell-side catalyst layer except that the slurry for forming the outlet cell-side catalyst layer contains the catalytic metal particles and the support that are included in the outlet cell-side catalyst layer, description thereof will be omitted.

Although a method for supplying the slurry for forming the outlet cell-side catalyst layer to the surface on the outlet cell side of the partition wall is not particularly limited and can be a commonly used method, an example of the method is a method in which the honeycomb substrate is immersed in the slurry from the outlet-side end face, and is removed from the slurry after a predetermined time. In this method, the inlet cell may be pressurized from the inlet-side end to cause a pressure difference between the inlet cell and the outlet cell so that the slurry will not penetrate the partition wall. Properties of the slurry such as solid concentration and viscosity may be adjusted as appropriate so that the slurry will not penetrate the partition wall. Since drying conditions and firing conditions are similar to those of the method for forming the inlet cell-side catalyst layer, description thereof will be omitted. Properties of the outlet cell-side catalyst layer such as thickness and porosity can be adjusted by the properties of the slurry, the amount of slurry to be supplied, the drying conditions, the firing conditions, etc.

b. Outlet Cell-Side Catalyst Layer Provided in the Internal Region in the Outlet Cell Side of the Partition Wall The length in the extending direction of the outlet cell-side catalyst layer is usually 10% to 100%, preferably 30% to 100%, more preferably 50% to 100%, of the total length in the extending direction of the honeycomb substrate. With the length being equal to or larger than the lower limit of this range, a sufficient contact time of exhaust gas with the outlet cell-side catalyst layer is ensured even in situations where the flow rate of the exhaust gas is high under high load operating conditions. Exhaust gas control performance is therefore improved.

Although the thickness of the outlet cell-side catalyst layer is not particularly limited and can be a commonly used thickness, it is usually 50% to 100% of the thickness of the partition wall. With the thickness being equal to or larger than the lower limit of this range, exhaust gas contacts the catalyst layer with sufficient frequency when passing through the partition wall.

The outlet cell-side catalyst layer usually includes catalytic metal particles and a support having the catalytic metal particles supported thereon. For example, the outlet cell-side catalyst layer is configured by placing a support with catalyst, which has catalytic metal particles supported thereon, in the pores in the partition wall.

Since the material of the catalytic metal particles is similar to that in the inlet cell-side catalyst layer except that rhodium (Rh) etc. are preferable, description thereof will be omitted. Since the average particle size of the catalytic metal particles is similar to that in the inlet cell-side catalyst layer, description thereof will be omitted.

Although the content of the catalytic metal particles is not particularly limited and can be a commonly used content, the content of the catalytic metal particles varies depending on the material of the catalytic metal particles. For example, when the material of the catalytic metal particles is Rh, Pd, or Pt, the content of the catalytic metal particles is usually 0.01 g to 2 g per liter of the honeycomb substrate. With the content being equal to or higher than the lower limit of this range, a sufficient catalytic action is achieved. With the content being equal to or lower than the upper limit of this range, grain growth of the catalytic metal particles is reduced. The content being equal to or lower than the upper limit of this range is also advantageous in terms of cost. The content of the catalytic metal particles per liter of the honeycomb substrate refers to a value similar to that of the catalytic metal particles contained in the outlet cell-side catalyst layer provided on the surface on the outlet cell side of the partition wall.

Since the material and form of the support are similar to those in the inlet cell-side catalyst layer, description thereof will be omitted. Although the average particle size of the support in the form of powder is not particularly limited, it is usually 0.1 μm to 10 μm. With the average particle size being equal to or larger than the lower limit of this range, the support has sufficient heat resistance properties. With the average particle size being equal to or smaller than the upper limit of this range, the catalytic metal particles are allowed to disperse sufficiently on the support, and exhaust gas control performance is therefore effectively improved. Moreover, the support with catalyst that has the catalytic metal particles supported thereon can be efficiently placed in the pores in the partition wall. For example, the "average particle size of the support in the form of powder" refers to the median particle size in particle size distribution obtained by a laser diffraction method. Since the ratio of the weight of the catalytic metal particles to the total weight of the catalytic metal particles and the support is similar to that in the inlet cell-side catalyst layer, description thereof will be omitted. Since a method for causing the catalytic metal particles to be supported on the support is similar to that for the inlet cell-side catalyst layer, description thereof will be omitted. Like the inlet cell-side catalyst layer, the outlet cell-side catalyst layer may also include a co-catalyst.

Although the content of the outlet cell-side catalyst layer is not particularly limited, it is usually 30 g to 150 g, preferably 50 g to 150 g, per liter of a part of the honeycomb substrate in which the outlet cell-side catalyst layer is provided. With the content of the outlet cell-side catalyst layer being equal to or higher than the lower limit of this range, exhaust gas control performance is effectively improved. With the content of the outlet cell-side catalyst layer being equal to or lower than the upper limit of this range, pressure loss is effectively reduced. The content of the outlet cell-side catalyst layer per liter of the part of the honeycomb substrate in which the outlet cell-side catalyst layer is provided refers to the weight of the outlet cell-side catalyst layer divided by the volume (L) of the part of the honeycomb substrate in which the outlet cell-side catalyst layer is provided.

Although a method for forming the outlet cell-side catalyst layer is not particularly limited and can be a commonly used method, an example of the method is a method in which slurry for forming the outlet cell-side catalyst layer is supplied to the internal region in the outlet cell side of the partition wall and is then dried and fired.

The slurry for forming the outlet cell-side catalyst layer is similar to that in the method for forming the inlet cell-side catalyst layer except that the slurry for forming the outlet cell-side catalyst layer contains the catalytic metal particles and the support that are included in the outlet cell-side catalyst layer, that the slurry for forming the outlet cell-side catalyst layer may not contain a pore-forming material, and that the average particle size etc. of the support in the form of powder contained in the slurry may be adjusted as appropriate so that the slurry will penetrate the partition wall, description thereof will be omitted.

Although a method for supplying the slurry for forming the outlet cell-side catalyst layer to the internal region in the outlet cell side of the partition wall is not particularly limited and can be a commonly used method, an example of the method is a method in which the honeycomb substrate is immersed in the slurry from the outlet-side end face, and is removed from the slurry after a predetermined time. In this method, properties of the slurry such as solid concentration and viscosity may be adjusted as appropriate so that the slurry will penetrate the partition wall. Since drying conditions and firing conditions are similar to those of the method for forming the inlet cell-side catalyst layer, description thereof will be omitted. Properties of the outlet cell-side catalyst layer such as thickness and porosity can be adjusted by the properties of the slurry, the amount of slurry to be supplied, the drying conditions, the firing conditions, etc.

When the exhaust gas control apparatus further includes the outlet cell-side catalyst layer, it is preferable that the catalytic metal particles included in the inlet cell-side catalyst layer contain at least one selected from the group consisting of palladium (Pd) and platinum (Pt) and that the catalytic metal particles included in the outlet cell-side catalyst layer contain rhodium (Rh). Since exhaust gas contacts the outlet cell-side catalyst layer after hydrocarbons (HCs) contained in the exhaust gas are effectively removed by the catalytic metal particles included in the inlet cell-side catalyst layer, rhodium (Rh) contained in the catalytic metal particles included in the outlet cell-side catalyst layer are less likely to be poisoned by the hydrocarbons (HCs).

Figure 2:
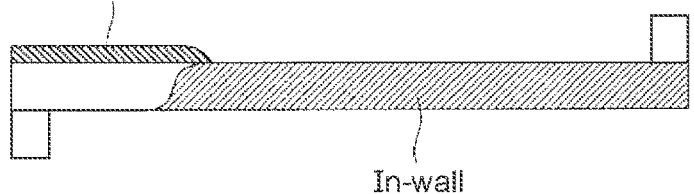
FIG. 2 illustrates an example of an exhaust gas control apparatus of the disclosure.

FIG. 2 shows an example of the exhaust gas control apparatus of the disclosure. The exhaust gas control apparatus shown in FIG. 2 includes an on-wall inlet cell-side catalyst layer having pores formed therein and an in-wall outlet cell-side catalyst layer.

Although some examples of the disclosure will be described, the disclosure is not intended to be limited to these examples.

1. Relationship Between Pore-Forming Material and Porosity

In order to examine the relationship between the pore-forming material that is introduced and the porosity regarding formation of the inlet cell-side catalyst layer, catalyst layers containing different amounts of pore-forming material were formed. First, a slurry catalyst layer was formed on a surface of a partition wall of a honeycomb substrate with a straight flow structure by using slurry for forming a catalyst layer. The slurry contained rhodium nitrate adjusted to 0.3 g/L-cat, alumina, an oxygen storage component (OSC), 0 wt %, 1 wt %, 2.5 wt %, 5 wt %, or 6 wt % of a fibrous pore-forming material based on the total weight of the catalyst layer (a fibrous pore-forming material composed of polyethylene terephthalate (PET) fibers (average aspect ratio: 14) with an average diameter of 4 μm was used), and water. Next, the slurry catalyst layer was dried by ventilation at 200° C. for two hours. The honeycomb substrate having the slurry catalyst layer formed therein was then fired at 500° C. for one hour to form a catalyst layer.

For each of the catalyst layers formed using different amounts of pore-forming material, porosity was calculated using a binarized SEM image of a section of the catalyst layer.

The "binarized SEM image of the section of the catalyst layer" was specifically obtained as follows.

(1) A section of the formed catalyst layer was exposed, and a backscattered electron SEM image of the exposed section was obtained under the following conditions. SEM: HITACHI S-4800, output: 15 kV, and magnification: 3000×. The obtained SEM image was binarized using analysis software WinROOF to separate pores in the catalyst layer.

(2) The proportion (%) of the pores separated in step (1) in the total area of the catalyst layer was obtained.

(3) The steps (1) and (2) were performed for 10 images and the average value was obtained.

Figure 3:
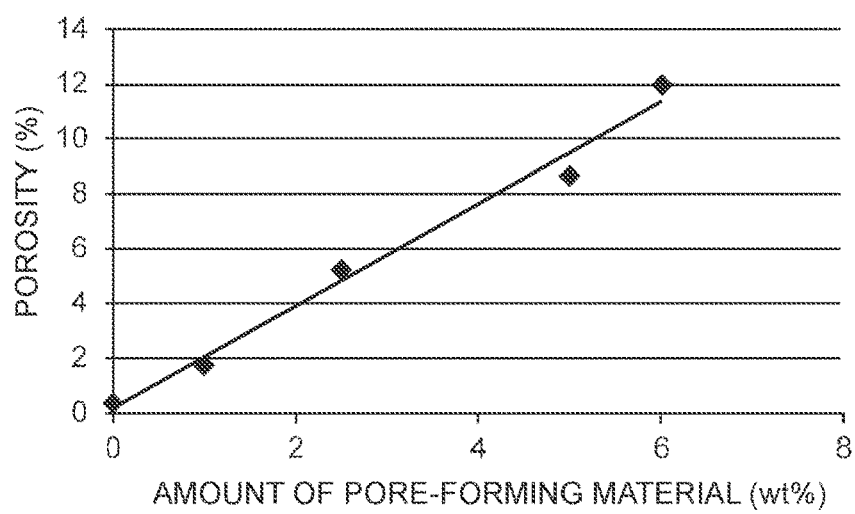
FIG. 3 is a graph illustrating the relationship between the amount of pore-forming material and the porosity as measured in a binarized scanning electron microscope (SEM) image.

FIG. 3 shows the relationship between the amount of pore-forming material and the porosity obtained using the binarized SEM image.

It was found from FIG. 3 that the amount of pore-forming material and the porosity have a proportional relationship in formation of the catalyst layer. It was therefore found that the porosity of the catalyst layer can be adjusted by the amount of pore-forming material at the time of forming the catalyst layer.

For each of the catalyst layers formed using 0 wt % of the pore-forming material (without the pore-forming material) and 2.5 wt % of the pore-forming material (with the pore-forming material), the proportions of small pores with a diameter of 4 μm or less, medium pores with a diameter of 4 μm to 10 μm, and large pores with a diameter of 10 μm or more in the porosity were obtained by mercury porosimetry. In mercury porosimetry, pores with a diameter in the range of 110 μm to 0.007 μm were evaluated by measuring them in the pressure range of 0.01 MPa to 200 MPa. The results are shown in Table 1 and FIG. 4.

TABLE 1

| | Porosity (%) | | |
| --- | --- | --- | --- |
| | Small Pores | Medium Pores | Large Pores |
| Without Pore-Forming Material | 2.7 | 3.0 | 0.0 |
| With Pore-Forming Material | 2.7 | 4.3 | 0.6 |

Figure 4:
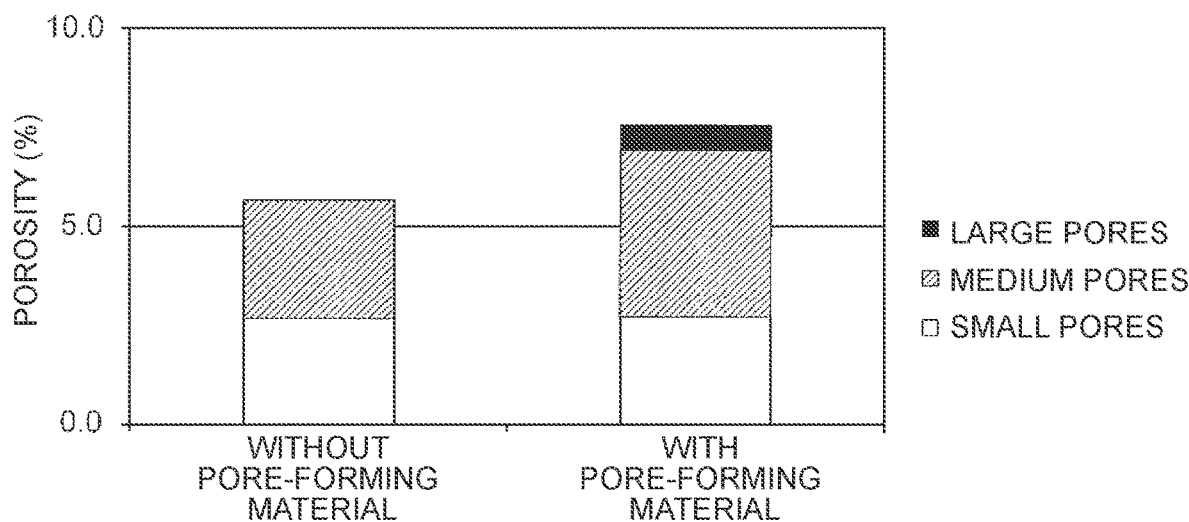
FIG. 4 is a graph illustrating the difference in porosity as measured by mercury porosimetry with and without the pore-forming material.

The results in Table 1 and FIG. 4 show that adding the pore-forming material at the time of forming the catalyst layer increases the proportion of medium pores with a diameter of 4 μm to 10 μm and also allows formation of large pores with a diameter of 10 μm or more.

2. Manufacturing of Exhaust Gas Control Apparatus

Example 1

Figure 5A:
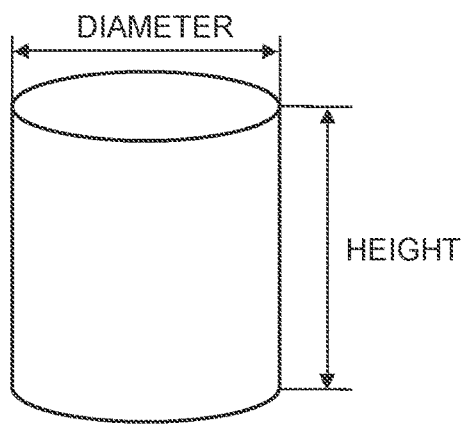
FIG. 5A schematically illustrates the appearance of a honeycomb substrate with a wall flow structure used in an example and comparative examples.

A slurry inlet cell-side catalyst layer was first formed on the surface on the inlet cell side of a partition wall of a honeycomb substrate with the following wall flow structure by using slurry for forming an inlet cell-side catalyst layer.
Shape of honeycomb substrate: cylinder
Size of honeycomb substrate: diameter of 117 mm×height (axial length) of 122 mm
Cell structure: 300 cells/inch$^2$.
Thickness of partition wall: 200 μm
This honeycomb substrate is schematically shown in FIG. 5A. The slurry contained rhodium nitrate adjusted to 0.3 g/L-cat, alumina, an OSC, 2.5 wt % of a pore-forming material based on the total weight of the inlet cell-side catalyst layer (the pore-forming material used in "1. Relationship Between Pore-Forming Material and Porosity"), and water. Next, the slurry inlet cell-side catalyst layer was dried by ventilation at 200° C. for two hours. The honeycomb substrate having the slurry inlet cell-side catalyst layer formed therein was then fired at 500° C. for one hour.

Thereafter, a slurry outlet cell-side catalyst layer was formed in an internal region in the outlet cell side of the partition wall of the honeycomb substrate with the slurry inlet cell-side catalyst layer formed therein by using slurry for forming an outlet cell-side catalyst layer. The slurry contained alumina and water. Subsequently, the slurry outlet cell-side catalyst layer was dried by ventilation at 200° C. for two hours. The honeycomb substrate having the slurry outlet cell-side catalyst layer formed therein was then fired at 500° C. for one hour.

Figure 5B:
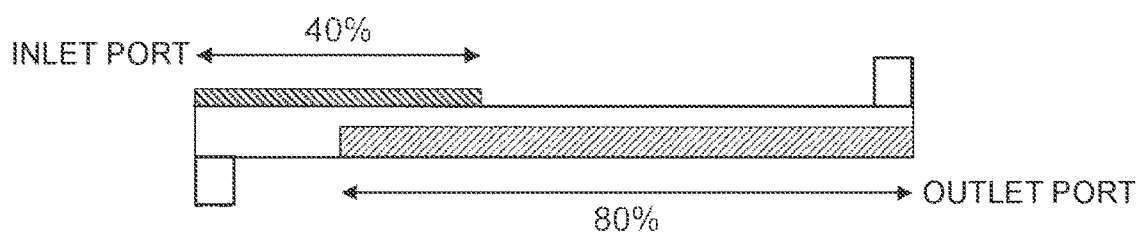
FIG. 5B schematically illustrates the catalyst configuration of exhaust gas control apparatuses manufactured in the example and the comparative examples.

As schematically shown in FIG. 5B, the inlet cell-side catalyst layer having a length equal to 40% of the total length in the extending direction of the honeycomb substrate from the inlet-side end of the partition wall was thus formed on the surface on the inlet cell side of the partition wall, and the outlet cell-side catalyst layer having a length equal to 80% of the total length in the extending direction of the honeycomb substrate from the outlet-side end of the partition wall was formed in the internal region in the outlet cell side of the partition wall. An exhaust gas control apparatus was manufactured in this manner.

Comparative Example 1

An exhaust gas control apparatus was manufactured in a manner similar to that of Example 1 except that the pore-forming material was not added.

Comparative Example 2

An exhaust gas control apparatus was manufactured in a manner similar to that of Example 1 except that the content of the pore-forming material was adjusted to 5.0 wt % based on the total weight of the inlet cell-side catalyst layer.

Reference Example 1

A slurry catalyst layer was first formed on a surface of a partition wall of a honeycomb substrate with the following straight flow structure by using slurry for forming a catalyst layer.
Shape of honeycomb substrate: cylinder
Size of honeycomb substrate: diameter of 117 mm×height (axial length) of 122 mm
Cell structure: 400 cells/inch$^2$
Thickness of partition wall: 115 μm
The slurry contained rhodium nitrate adjusted to 0.3 g/L-cat, alumina, an OSC, 2.5 wt % of a pore-forming material based on the total weight of the catalyst layer (the pore-forming material used in "1. Relationship Between Pore-Forming Material and Porosity"), and water. Next, the slurry catalyst layer was dried at 200° C. for two hours. The honeycomb substrate having the slurry catalyst layer formed therein was then fired at 500° C. for one hour.

The catalyst layer having a length equal to 40% of the total length in the extending direction of the honeycomb substrate from the inlet-side end of the partition wall was thus formed on the surface of the partition wall. An exhaust gas control apparatus was manufactured in this manner.

Reference Example 2

An exhaust gas control apparatus was manufactured in a manner similar to that of Reference Example 1 except that the content of the pore-forming material was adjusted to 5.0 wt % based on the total weight of the catalyst layer.

3. Evaluation

Figure 6:
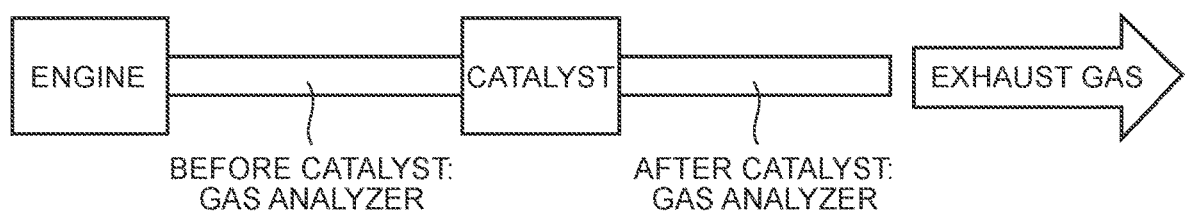
FIG. 6 schematically illustrates the evaluation layout used for evaluation of the exhaust gas control apparatuses manufactured in the example, the comparative examples, and reference examples.

For each of the exhaust gas control apparatuses of Example 1, Comparative Examples 1 and 2, and Reference Examples 1 and 2, the NOx removal rate was measured in the temperature range of 200° C. to 600° C. by passing stoichiometric gas through a heat exchanger in a 2.5-liter gasoline engine bench, based on the evaluation layout shown in FIG. 6. Table 2 and FIG. 7 show the relationship between the amount of pore-forming material and the maximum NOx removal rate of each exhaust gas control apparatus.

TABLE 2

|  | Pore-Forming Material (wt %) | Maximum NOx Removal Rate |
|---|---|---|
| Reference Example 1 | 2.5 | 83.04 |
| Reference Example 2 | 5.0 | 83.37 |
| Comparative Example 1 | 0 | 71.13 |
| Example 1 | 2.5 | 72.87 |
| Comparative Example 2 | 5.0 | 63.06 |

Figure 7:
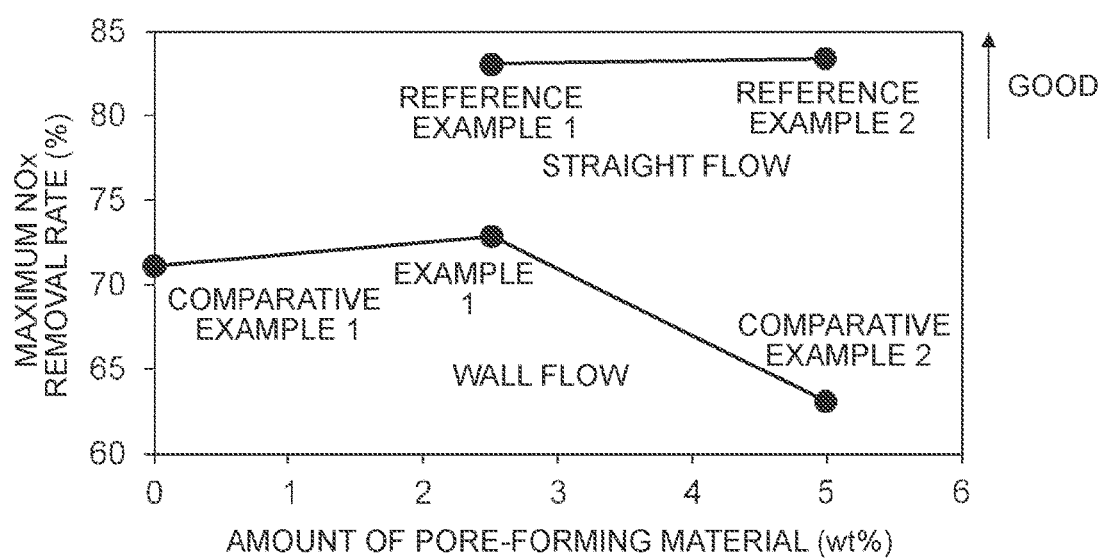
FIG. 7 is a graph illustrating the relationship between the amount of pore-forming material and the maximum NOx removal rate of each exhaust gas control apparatus.

Referring to FIG. 7, the results for Example 1 and Comparative Examples 1 and 2 show that there is an optimum amount of pore-forming material that is used to manufacture an exhaust gas control apparatus having a honeycomb substrate with a wall flow structure. That is, the results for Example 1 and Comparative Examples 1 and 2 show that exhaust gas control performance is improved by using up to 3 wt % of the pore-forming material based on the total weight of the inlet cell-side catalyst layer to manufacture such an exhaust gas control apparatus. The results for Example 1 and Comparative Examples 1 and 2 also show that when the amount of pore-forming material is larger than this amount, the exhaust gas flow changes and the exhaust gas control performance is degraded. Accordingly, based on the results for Example 1 and Comparative Examples 1 and 2 and the experimental results in "1. Relationship Between Pore-Forming Material and Porosity," it was found that an exhaust gas control apparatus having a honeycomb substrate with a wall flow structure in which an inlet cell-side catalyst layer has a porosity of 0.1% to 8% as measured in a binarized scanning electron microscope (SEM) image of a section of the inlet cell-side catalyst layer can be manufactured by using 1 wt % to 3 wt %, especially 2 wt % to 3 wt %, of a pore-forming material based on the total weight of the inlet cell-side catalyst layer. It was also found that the manufactured exhaust gas control apparatus has an improved NOx removal rate as diffusion efficiency of exhaust gas in the inlet cell-side catalyst layer is improved.

The results for Reference Examples 1 and 2 show that exhaust gas control performance of an exhaust gas control apparatus having a honeycomb substrate with a straight flow structure will not be degraded by an increase in amount of pore-forming material that is used to manufacture the exhaust gas control apparatus. In the above evaluation, the absolute values of the NOx removal rates of the exhaust gas control apparatuses having a honeycomb substrate with a straight flow structure are larger than those of the NOx removal rates of the exhaust gas control apparatuses having a honeycomb substrate with a wall flow structure. This is because the thickness of the partition wall of the honeycomb substrate with a straight flow structure is smaller than that of the partition wall of the honeycomb substrate with a wall flow structure and the number of cells in the honeycomb substrate with a straight flow structure is larger than that in the honeycomb substrate with a wall flow structure.

What is claimed is:

1. An exhaust gas control apparatus, comprising:
   a honeycomb substrate; and
   an inlet cell-side catalyst layer, wherein:
   the honeycomb substrate includes a porous partition wall that defines a plurality of cells extending from an inlet-side end face to an outlet-side end face;
   the cells include an inlet cell and an outlet cell that are adjacent to each other with the partition wall between the inlet cell and the outlet cell;
   the inlet cell is open at an inlet-side end of the inlet cell and is sealed at an outlet-side end of the inlet cell;
   the outlet cell is sealed at an inlet-side end of the outlet cell and is open at an outlet-side end of the outlet cell;
   the inlet cell-side catalyst layer is provided on a surface on an inlet cell side of the partition wall and extends from an inlet-side end of the partition wall; and
   porosity of the inlet cell-side catalyst layer is 0.1% to 8% as measured in a binarized scanning electron microscope image of a section of the inlet cell-side catalyst layer.

2. The exhaust gas control apparatus according to claim 1, wherein the porosity of the inlet cell-side catalyst layer based on pores with a diameter of 4 μm to 10 μm is 1% to 5% as measured by mercury porosimetry.

3. The exhaust gas control apparatus according to claim 1, wherein the inlet cell-side catalyst layer is provided on the surface on the inlet cell side of the partition wall and extends to a position of 5% to 90% of a total length in an extending direction of the honeycomb substrate from the inlet-side end of the partition wall.

4. The exhaust gas control apparatus according to claim 1, wherein a content of the inlet cell-side catalyst layer is 30 g to 150 g per liter of a part of the honeycomb substrate in which the inlet cell-side catalyst layer is provided.

5. The exhaust gas control apparatus according to claim 1, further comprising an outlet cell-side catalyst layer provided on a surface on an outlet cell side of the partition wall and extending from an outlet-side end of the partition wall.

6. A method for manufacturing the exhaust gas control apparatus according to claim 1, the method comprising:
   supplying slurry for forming the inlet cell-side catalyst layer into the inlet cell of the honeycomb substrate to form a slurry inlet cell-side catalyst layer; and
   firing the honeycomb substrate after the slurry inlet-cell side catalyst layer is formed, wherein the slurry for forming the inlet cell-side catalyst layer contains 1 wt % to 3 wt % of a pore-forming material based on a total weight of the inlet cell-side catalyst layer.

7. The method according to claim 6, wherein the pore-forming material is a fibrous pore-forming material, an average diameter of the pore-forming material is 0.7 μm to 15 μm, and an average aspect ratio of the pore-forming material is 9 to 40.

* * * * *